United States Patent [19]
Chen et al.

[11] Patent Number: 6,008,611
[45] Date of Patent: Dec. 28, 1999

[54] METHOD AND SYSTEM FOR DRIVING A THREE-PHASE MOTOR IN A MASS STORAGE DEVICE

[75] Inventors: Hao Chen, Plano; Edward N. Jeffrey, Garland; Fredrick W. Trafton, Lewisville, all of Tex.

[73] Assignee: Texas Instruments Incorporated, Dallas, Tex.

[21] Appl. No.: 09/196,788

[22] Filed: Nov. 20, 1998

[51] Int. Cl.$^6$ .................................................. G05B 11/28
[52] U.S. Cl. ............................ 318/599; 318/254; 318/811
[58] Field of Search ................................... 318/254, 439, 318/138, 599, 807–811, 503; 388/804, 811, 819, 829, 831

[56] References Cited

U.S. PATENT DOCUMENTS

| | | | |
|---|---|---|---|
| 5,767,641 | 6/1998 | Kern et al. ................................. | 318/254 |
| 5,777,449 | 7/1998 | Schlager .................................... | 318/459 |
| 5,804,939 | 9/1998 | Yamai et al. ............................. | 318/439 |
| 5,877,602 | 3/1999 | Kondoh et al. .......................... | 318/254 |
| 5,883,479 | 3/1999 | Menegoli et al. ....................... | 318/254 |
| 5,939,850 | 8/1999 | Kondoh ................................... | 318/254 |

OTHER PUBLICATIONS

Inventor Bertram J. White, "Method and Apparatus for Driving a Polyphase, Brushless DC Motor", pending Provisional Patent Application, Serial No. 60/083,156, Apr. 27, 1998.

*Primary Examiner*—Brian Sircus
*Attorney, Agent, or Firm*—W. Daniel Swayze, Jr.; Wade James Brady, III; Richard L. Donaldson

[57] ABSTRACT

A method of driving an electric motor includes generating a periodic, driving voltage. The driving voltage comprises a sequence of first, second, and third waveforms. The first waveform in the sequence is a generally constant, high voltage. The second waveform in the sequence is a down hook voltage. The third waveform in the sequence is an up hook voltage. The method also includes applying the driving voltage to a coil of the motor to generate a generally sinusoidal current through the coil of the motor.

19 Claims, 4 Drawing Sheets

| FIG. 7 | | FIRST PERIOD | | |
|---|---|---|---|---|
| | PHASE VOLTAGE SIGNAL 70 | HIGH VOLTAGE | DOWN HOOK WAVEFORM 82 | UP HOOK WAVEFORM 84 |
| | PHASE VOLTAGE SIGNAL 72 | UP HOOK WAVEFORM 84 | HIGH VOLTAGE | DOWN HOOK WAVEFORM 82 |
| | PHASE VOLTAGE SIGNAL 74 | DOWN HOOK WAVEFORM 82 | UP HOOK WAVEFORM 84 | HIGH VOLTAGE |

TIME (IN DEGREES)   0°   120°   240°   360°

METHOD AND SYSTEM FOR DRIVING A THREE-PHASE MOTOR IN A MASS STORAGE DEVICE

TECHNICAL FIELD OF THE INVENTION

This invention relates generally to the field of electric motor driving systems and, more particularly, to a method and apparatus for driving a three-phase motor to reduce acoustic noise in a mass storage device.

BACKGROUND OF THE INVENTION

A mass storage device, such as a hard disk drive, utilizes a spindle motor to rotate platters that store information. The spindle motor generally rotates the platters at a constant angular speed while electromagnetic heads read from or write to circular tracks on the platters. The spindle motor is often implemented as a three phase motor.

A typical, three-phase motor includes a magnetic rotor and three electric coils. The three electric coils are related to the three phases of the motor. A separate current, called a phase current, flows through each of the three electric coils of the motor. The rotor rotates in response to an electrical field created by the phase currents.

The phase currents flowing through the three electric coils generally interact with the magnetic elements in the motor to produce acoustic noise. In some traditional drives, each of the motor's three electric coils cycles through three states: each electric coil can be held at ground, driven to some positive voltage, or floated. As a result, the phase currents flowing through the electric coils have very abrupt transitions. Because torque is proportional to current, the abrupt changes in the phase currents cause the torque also to change abruptly. If the harmonics in the torque waveform excite mechanical resonances, the motor structure may vibrate and generate audible noise.

SUMMARY OF THE INVENTION

Accordingly, a need has arisen for an improved method and system for driving a three-phase motor. The present invention provides a method and system for driving a three-phase motor and a hard disk drive system incorporating the same that address the shortcomings of prior systems and methods and.

According to one embodiment of the invention, a method of driving an electric motor includes generating a periodic, driving voltage. The driving voltage comprises a sequence of first, second, and third waveforms. The first waveform in the sequence is a generally constant, high voltage. The second waveform in the sequence is a down hook voltage. The third waveform in the sequence is an up hook voltage. The method also includes applying the driving voltage to a coil of the motor to generate a generally sinusoidal current through the coil of the motor.

According to another embodiment of the invention, a hard disk drive system includes a disk storage media operable to store information and a spindle motor operable to rotate the disk storage media. The hard disk drive system also includes a motor driver. The motor driver is operable to apply a periodic, driving voltage to a coil of the motor to generate a generally sinusoidal current through the coil. The driving voltage comprises a sequence of first, second, and third waveforms. The first waveform in the sequence is a generally constant, high voltage. The second waveform in the sequence is a down hook voltage. The third waveform in the sequence is an up hook voltage.

Embodiments of the invention provide numerous technical advantages. For example, one embodiment of the invention drives each of three electric coils of a motor with a voltage that includes waveforms in the shape of a hook. These driving voltages with the hook-shaped waveforms generate sinusoidal phase currents in the electric coils of the motor. The sinusoidal phase currents do not exhibit the abrupt transitions that plague some traditional motors. Thus, the sinusoidal phase currents reduce the harmonics of the torque waveform generated by changes in the phase currents. As a result, the motor exhibits less acoustic noise.

A person skilled in the art can readily recognize other technical advantages from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which:

FIG. 7 is a table illustrating the sequences in which the multiplexer shown in FIG. 5 may combine the two hook waveforms of FIG. 6 and a high voltage signal to produce the phase voltage signals of FIG. 4.

DETAILED DESCRIPTION OF THE INVENTION

The present invention and its advantages are best understood by referring to FIGS. 1 through 7 of the drawings, like numerals being used for like and corresponding parts of the various drawings.

Figure 1:
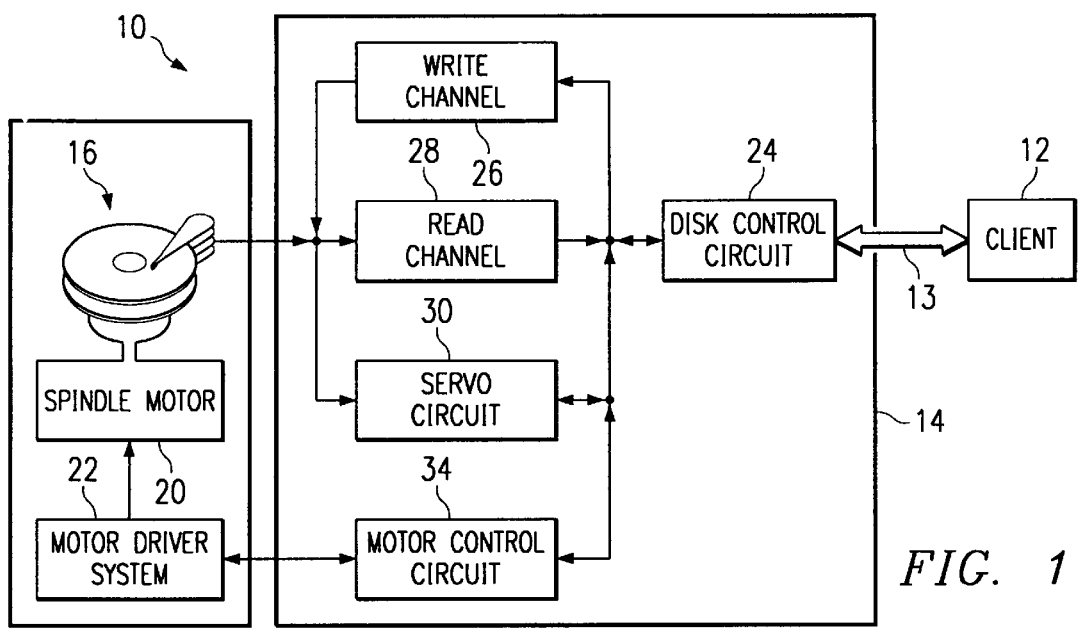
FIG. 1 is a block diagram of a hard disk drive system according to the teachings of the present invention.

FIG. 1 is a block diagram of a hard disk drive system 10 according to the teachings of the present invention. Hard disk drive system 10 stores data during write operations and retrieves data during read operations. Hard disk drive system 10 includes hard disk drive integrated circuit 14, disk/head assembly 16, spindle motor 20, and motor driver system 22.

Hard disk drive system 10 interfaces and exchanges data with a client 12 through bus 13. Hard disk drive system 10 receives data from client 12 and stores that data to disk/head assembly 16. Later, hard disk drive system 10 can retrieve the data from disk/head assembly 16 and provide that data back to client 12. Disk/head assembly 16 includes a number of rotating, magnetic platters. Electromagnetic heads store data to and retrieve data from circular tracks on the platters. A preamplifier (not explicitly shown) may be used to amplify the data signals as needed.

Spindle motor 20 rotates the platters in disk/head assembly 16 at a constant angular speed while the electromagnetic heads read from or write to the circular tracks on the platters. Motor 20 may include a magnetic rotor that rotates in response to an electrical field created by the phase currents flowing through each of the three electric coils.

Hard disk drive integrated circuit 14 processes the digital data exchanged between client 12 and disk/head assembly 16. Hard disk drive integrated circuit 14 includes disk control circuit 24, write channel 26, read channel 28, servo circuit 30, and motor control circuit 34.

Write channel 26 processes any data that is to be stored to disk/head assembly 16. During write operations, write channel 26 receives a digital data signal from disk control circuit 24. Write channel 26 reformats and codes the digital data signal for storage and provides an analog data signal to disk/head assembly 16.

Read channel 28 processes any data that is retrieved from disk/head assembly 16. During read operations, read channel 28 receives an analog data signal from disk/head assembly 16. Read channel 28 decodes and formats the analog data signal and provides a digital data signal to disk control circuit 24.

Servo circuit 30 provides position error signals associated with positioning a head in disk/head assembly 16 to disk control circuit 24 during read and write operations. Servo circuit 30 receives a servo wedge signal from disk/head assembly 16. The servo wedge signal includes position error information. Servo circuit 20 processes this information and generates a servo output signal, which is received by disk control circuit 24.

Disk control circuit 24 controls the various operations of hard disk drive system 10. Disk control circuit 24 receives data from client 12 through bus 13 and transmits a corresponding digital data signal to write channel 26. Disk control circuit 24 receives a digital data signal from read channel 28 and provides corresponding data to client 12 through bus 13. Disk control circuit 24 also receives position error information from servo circuit 30 in the form of a servo output signal. In response, disk control circuit 24 sends a motor control input signal to motor control circuit 34.

Motor control circuit 34 comprises circuitry to properly interface with motor driver system 22 to control spindle motor 20. Motor control circuit 34 receives a motor control input signal from disk control circuit 24.

Motor control circuit 34 processes the signal and sends a corresponding control signal to motor driver system 22.

Figure 2:
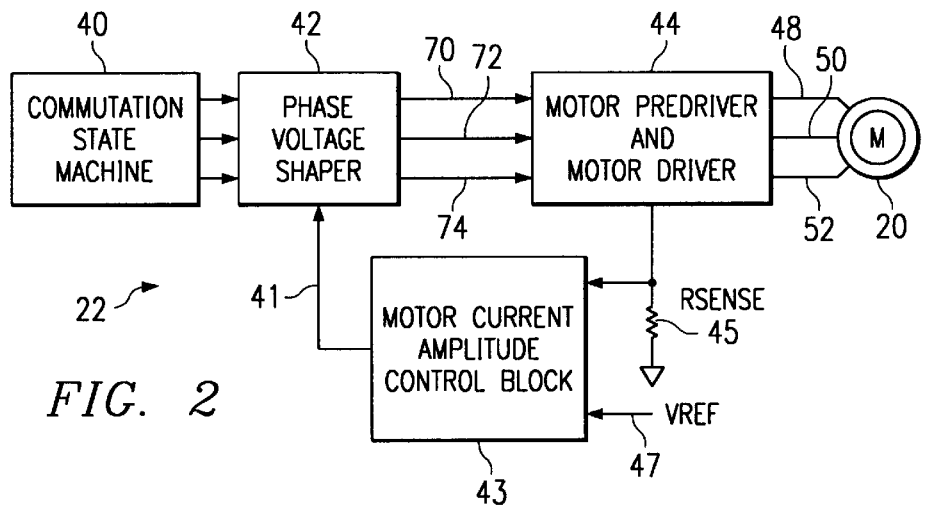
FIG. 2 is a block diagram of a motor driver system of the hard disk drive system shown in FIG. 1.

FIG. 2 is a block diagram showing additional details of motor driver system 22 illustrated in FIG. 1. Motor driver system 22 includes commutation state machine 40, phase voltage shaper 42, motor predriver and motor driver 44, sense resistor 45, and motor current amplitude control block 43. Motor driver system 22 produces three driving voltage signals 48, 50, and, 52. Driving voltage signals 48, 50, and 52 correspond to three electric coils in motor 20, and each driving voltage signal 48, 50, and 52 drives a separate one of the three coils in motor 20.

According to the teachings of the present invention, motor driver system 22 generates sinusoidal phase currents in the electric coils of motor 29, reducing the acoustic noise emitted by motor 20. Phase voltage shaper 42 produces phase voltage signals 70, 72, and 74 that include hook-shaped waveforms. Motor predriver and motor driver 44 duplicates phase voltage signals 70, 72, and 74 to produce corresponding driving voltage signals 48, 50, and 52 that also include hook-shaped waveforms. Due to their hook-shaped waveforms, driving voltage signals 48, 50, and 52 generate sinusoidal phase currents in the electric coils of motor 20. These sinusoidal phase currents do not exhibit the abrupt transitions that plague some traditional motors.

By eliminating the abrupt changes in the phase currents, the present invention reduces the harmonic content of the torque waveform associated with the phase currents. As a result, motor 20 emits less acoustic noise.

Commutation state machine 40 connects to phase voltage shaper 42. Commutation state machine 40 generates digital signals that relate to the form of each phase voltage signal 70, 72, and 74. From the digital signals received from commutation state machine 40, phase voltage shaper 42 generates three phase voltage signals 70, 72, and 74. As further explained below, phase voltage signals 70, 72, and 74 include hook-shaped waveforms.

Phase voltage signals 70, 72, and 74 drive motor predriver and motor driver 44. Motor predriver and motor driver 44 duplicates phase voltage signals 70, 72, and 74 to produce corresponding driving voltage signals 48, 50, and 52. Phase voltage signal 70 corresponds to driving voltage signal 48, which drives a first electric coil in motor 20. Phase voltage signal 72 corresponds to driving voltage signal 50, which drives a second electric coil in motor 20. Phase voltage signal 74 corresponds to driving voltage signal 52, which drives a third electric coil in motor 20. Because driving voltage signals 48, 50, and 52 are amplified versions of phase voltage signals 70, 72, and 74, driving voltage signals 48, 50, and 52 also include hook-shaped waveforms.

Due to the hook-shaped waveforms included in driving voltages signals 48, 50, and 52, driving voltage signals 48, 50, and 52 generate a sinusoidal phase current in each electric coil. These sinusoidal phase currents do not exhibit the abrupt transitions that plague some traditional motors. By eliminating the abrupt changes in the phase currents, driving voltage signals 48, 50, and 52 reduce the harmonic content of the torque waveform associated with the phase currents. As a result, motor 20 emits less acoustic noise.

In the illustrated embodiment, motor current amplitude control block 43 controls the amplitude of the hook-shaped waveforms of phase voltage signals 70, 72, and 74. Current from motor 20 runs through sense resistor 45 and generates a voltage. Motor current amplitude control block 43 compares the voltage across sense resistor 45 to reference voltage 47 and generates an analog signal 41. Analog signal 41 is representative and proportional to the desired amplitude of the hook-shaped waveforms of phase voltage signals 70, 72, and 74. Phase voltage shaper 42 adjusts the amplitude of the hook-shaped waveforms of phase voltage signals 70, 72, and 74 in proportion to the change in amplitude of analog signal 41. Because driving voltage signals 48, 50, and 52 are amplified versions of phase voltage signals 70, 72, and 74, motor current amplitude control block 43 affects the amplitude of the hook-shaped waveforms in driving voltage signals 48, 50, and 52. Changing the hook amplitude of driving voltage signals 48, 50, and 52 varies the motor current and thus the torque of motor 20.

Figure 3:
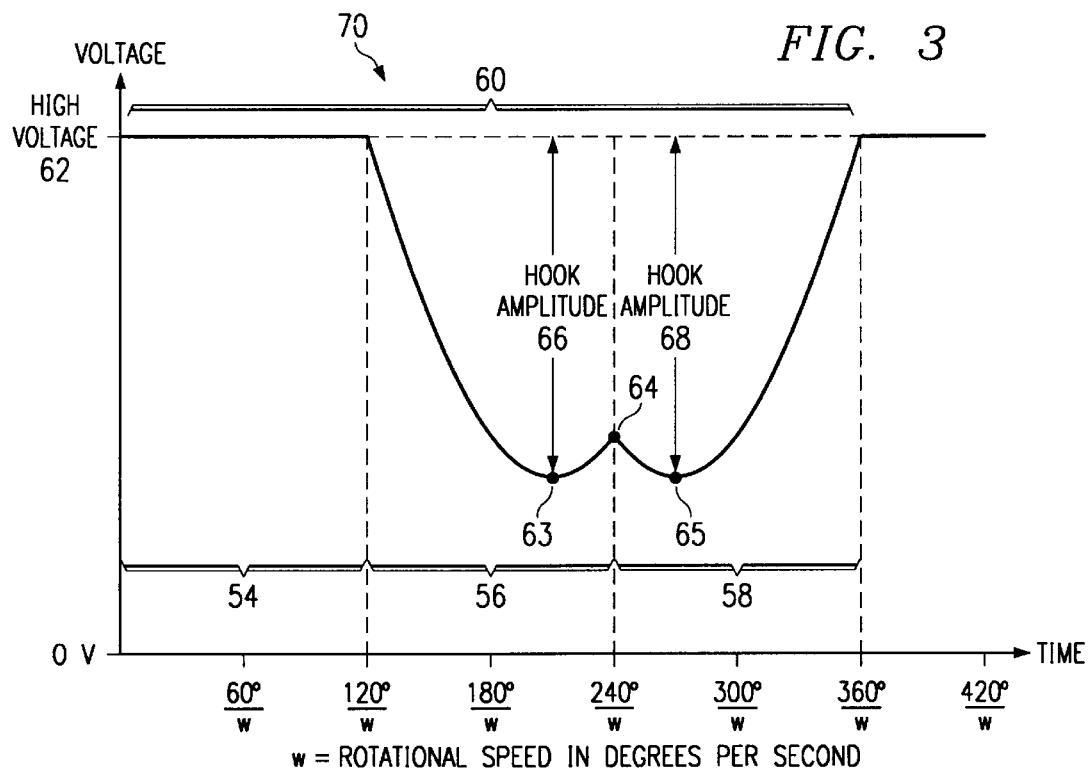
FIG. 3 is a graph over time of a phase voltage signal produced by a phase voltage shaper shown in FIG. 2, illustrating the hook-shaped waveforms included in phase voltage signals.

FIG. 3 is a graph over time of phase voltage signal 70 produced by phase voltage shaper 42, illustrating the hook-shaped waveforms included in phase voltage signal 70. As described in more detail below, phase voltage shaper 42 may produce a pulse-width modulated version of phase voltage signal 70. For the purpose of clarity, FIG. 3 displays a continuous, linear version of phase voltage signal 70. Phase voltage signal 70 is periodic, and each period 60 is 360°. Phase voltage signal 70 comprises three waveforms 54, 56, and 58.

Waveform 54 is a voltage held at a constant, high voltage 62 for about 120°.

Waveform 56 is a voltage that "down hooks" for about 120°. Waveform 56 is referred to as a down hook voltage because waveform 56 is shaped like a hook and generally decreases in voltage with time. Waveform 56 decreases from high voltage 62 to low voltage 63 and then increases slightly to voltage 64. The difference in voltage between high voltage 62 and low voltage 63 is hook amplitude 66. In one embodiment, waveform 56 flows from high voltage 62 to voltage 64 as a function of (high voltage 62–hook amplitude 66\*sin (wt-120°)), where w is the rotational speed of motor 20 in degrees per second.

Waveform 58 is a voltage that "up hooks" for about 120°. Waveform 58 is referred to as a up hook voltage because waveform 58 is shaped like a hook and generally increases in voltage with time. Waveform 58 decrease slightly from voltage 64 to low voltage 65 and then increases to high voltage 62. The difference in voltage between high voltage 62 and low voltage 65 is hook amplitude 68. In one embodiment, waveform 58 flows from voltage 64 to high voltage 62 as a function of (high voltage 62–hook amplitude 68\*sin (wt-180°)), where w is the rotational speed of motor 20 in degrees per second.

Figure 4:
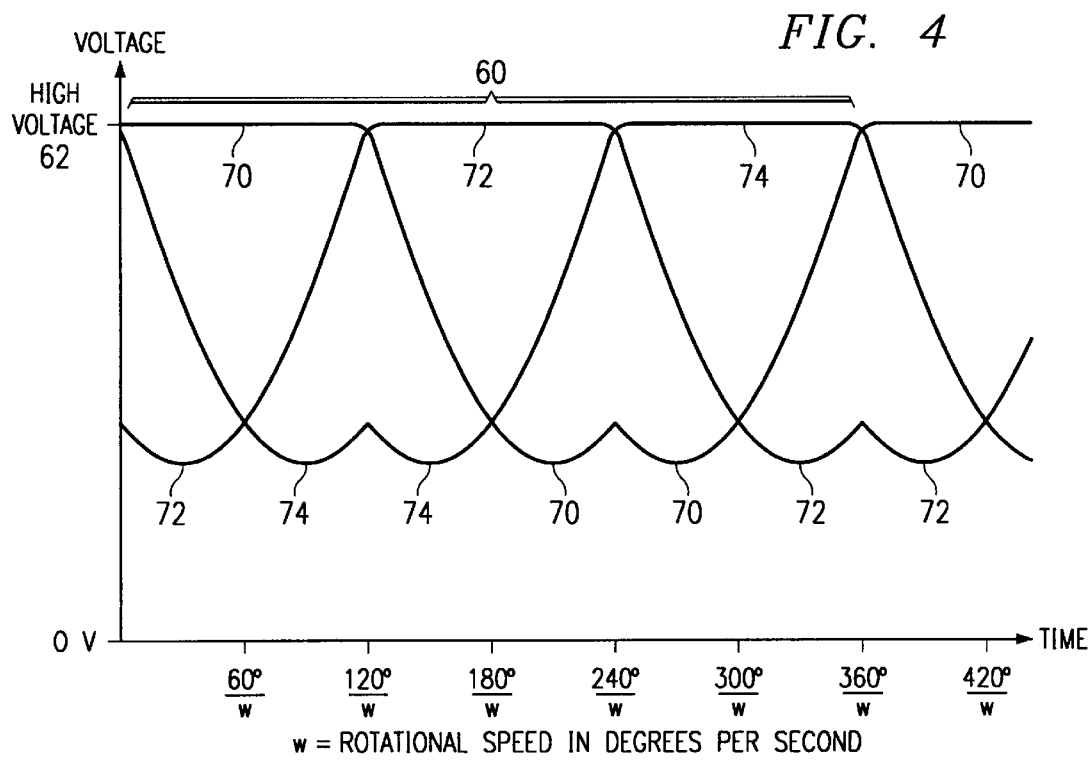
FIG. 4 is a graph over time of all three phase voltage signals produced by the phase voltage shaper shown in FIG. 2, illustrating the phase differences between the three phase voltage signals.
Figure 5:
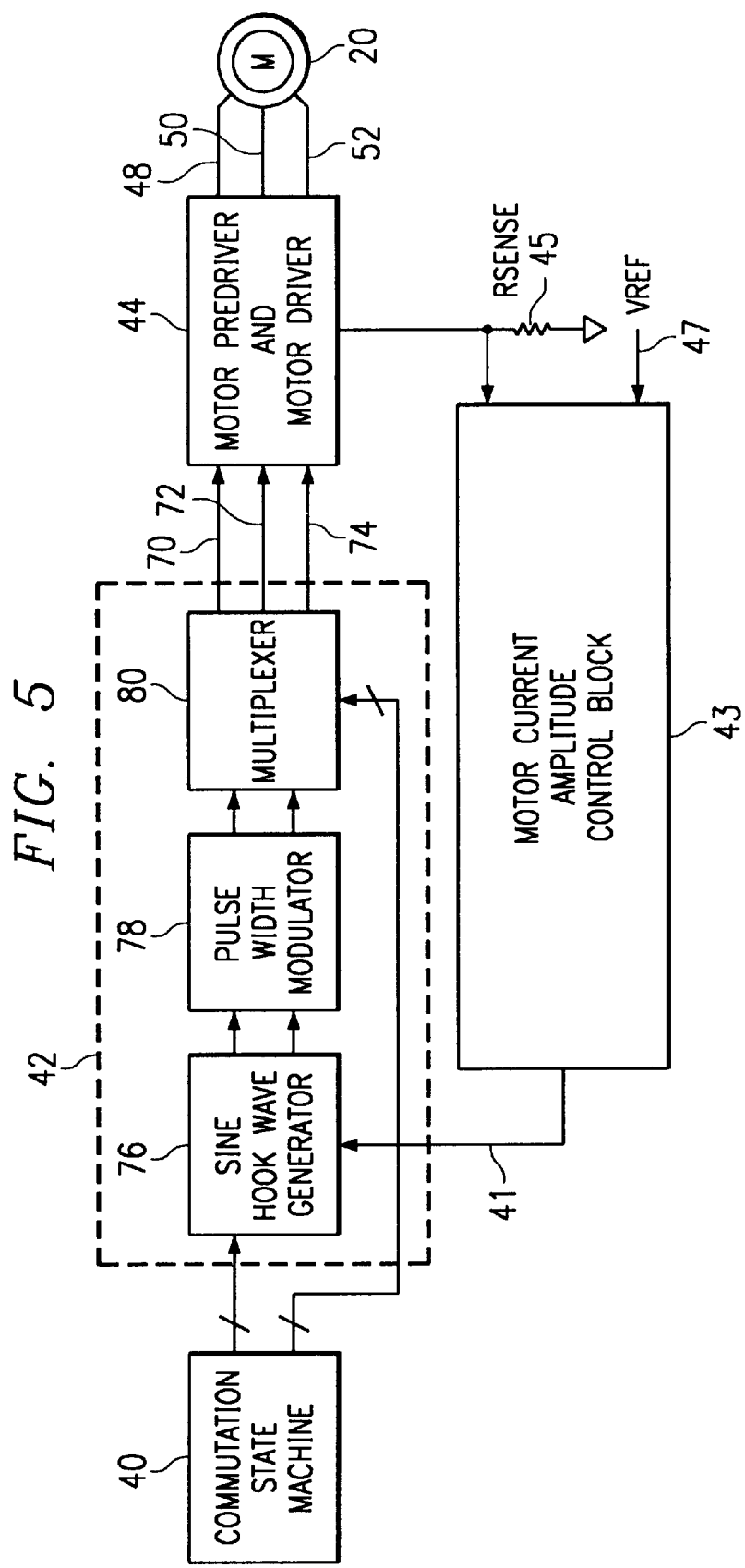
FIG. 5 is a block diagram of the motor driver system of FIG. 2, providing additional details of one embodiment of the phase voltage shaper.

FIG. 4 is a graph over time of all three phase voltage signals 70, 72, and 74 produced by phase voltage shaper 42, illustrating the phase differences between three phase voltage signals 70, 72, and 74. Phase voltage signals 72 and 74 share the same shape as phase voltage signal 70 of FIG. 3. Phase voltage signals 70, 72, and 74, however, are displaced from one another by 120°. Phase voltage signal 70 leads phase voltage signal 72 by 120°, and phase voltage signal 70 leads phase voltage signal 74 by 240°. Thus, at any given time, each of phase voltage signals 70, 72, and 74 comprise a separate one of three waveforms 54, 56, and 58. FIG. 5 illustrates one embodiment of phase voltage shaper 42 that produces phase voltage signals 70, 72, and 74.

Figure 6A:
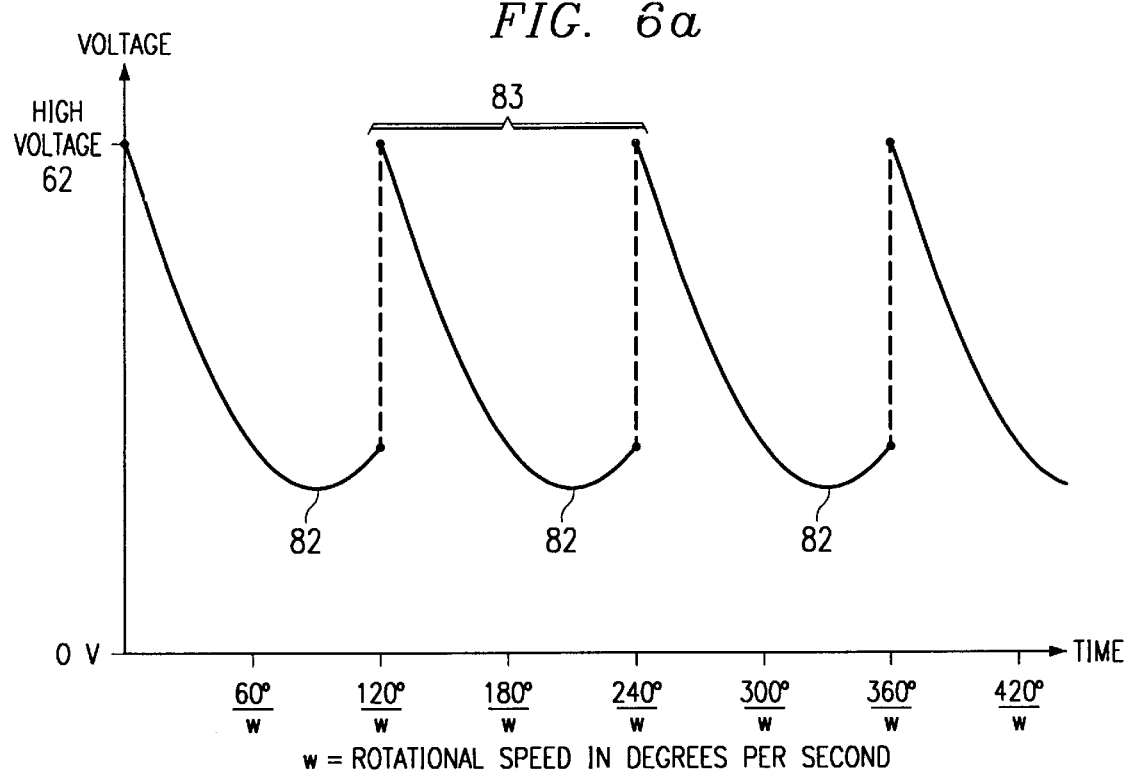
FIGS. 6A and 6B are graphs over time of the two hook waveforms generated by the sine hook wave generator shown in FIG. 5.
Figure 6B:
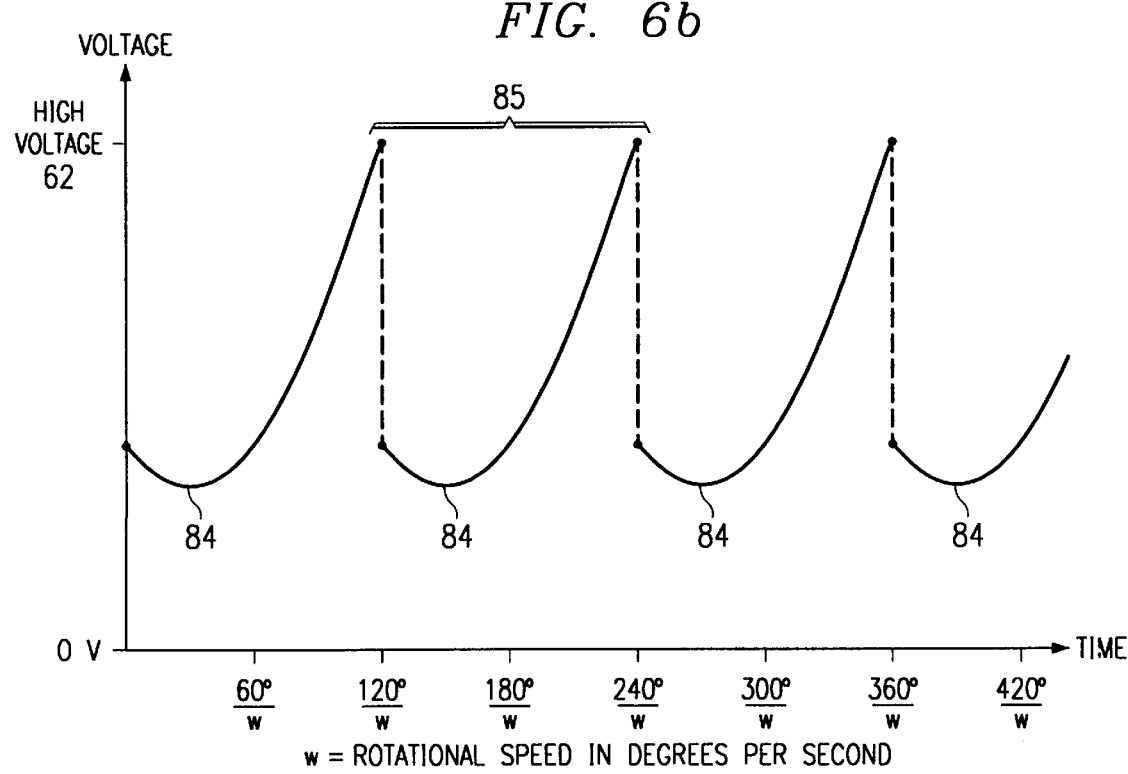

FIG. 5 is a block diagram of motor driver system 22 of FIG. 2, showing additional details of one embodiment of phase voltage shaper 42. Phase voltage shaper 42 includes a sine hook wave generator 76, a pulse width modulator 78, and a multiplexer 80. Sine hook wave generator 76 receives digital signals from commutation state machine 40 and produces two hook waveforms, which are shown in FIGS. 6A and 6B. Pulse-width modulator 78 converts the two hook waveforms into pulse-width modulated, hook waveforms. As explained in conjunction with FIG. 7, multiplexer 80 receives the pulse-width modulated, hook waveforms and produces phase voltage signals 70, 72, and 74.

FIGS. 6A and 6B are graphs over time of two hook waveforms 82 and 84 generated by sine hook wave generator 76. Phase voltage shaper 42 utilizes hook waveforms 82 and 84 to produce waveforms 58 and 56, shown in FIG. 3.

FIG. 6A is a graph over time of hook waveform 82. Hook waveform 82 comprises a periodic, down hook voltage, and each period 83 is 120°. Hook waveform 82 corresponds to waveform 56 of FIG. 3. FIG. 6B is a graph over time of hook waveform 84. Hook waveform 84 comprises a periodic, up hook voltage, and each period 85 is 120°. Hook waveform 84 corresponds to waveform 58 of FIG. 3.

In one embodiment, sine hook wave generator 76 utilizes linear, digital-to-analog converters to produce hook waveforms 82 and 84. Sine hook wave generator 76 connects to commutation state machine 40. Commutation state machine 40 generates digital signals that relate to the form of hook waveforms 82 and 84. From the digital signals received from commutation state machine 40, phase voltage shaper 42 utilizes digital-to-analog converters to generate hook waveforms 82 and 84. The digital-to-analog converters function as a simple table-lookup block that produces quantized versions of the sine hook waveforms by approximating the exact hook waveforms 82 and 84.

Pulse-width modulator 78 converts hook waveforms 82 and 84 into pulse-width modulated, hook waveforms. The pulse-width modulated, hook waveforms comprise two voltages, a high voltage and a low voltage. The pulse-width modulated, hook waveforms alternate between the high voltage and the low voltage. To simulate the continuity of hook waveforms 82 and 84, each pulse-width modulated waveform alternates between the high voltage and the low voltage such that the weighted average of the voltages over any small interval of time equals the voltage of corresponding waveform 82 or 84 at that point in time.

When applied to the power switching devices in motor predriver and motor driver 44, the pulse-width modulated, hook waveforms generally dissipate less power than the linear versions of hook waveforms 82 and 84.

FIG. 7 is a table illustrating the sequences in which multiplexer 80 may combine hook waveforms 82 and 84, shown in FIG. 6A and 6B, and a high voltage signal to produce phase voltage signals 70, 72, and 74, shown in FIG. 4. Multiplexer 80 receives control signals from commutation state machine 40. At any given time, multiplexer 80 connects each of the high voltage signal, hook waveform 82, and hook waveform 84 to a separate phase voltage signal 70, 72, and 74 for about 120°. FIG. 7 demonstrates over one period of 360° a sequence that multiplexer 80 may use to produce phase voltage signals 70, 72, and 74. Generally, multiplexer 80 can produce each period of phase voltage signals 70, 72, and 74 by combining the high voltage for about 120°, down hook waveform 82 for about 120°, and up hook waveform 84 for about 120°.

According to the teachings of the present invention, motor driver system 22 generates sinusoidal phase currents in the electric coils of motor 29, reducing the acoustic noise emitted by motor 20. Due to their hook-shaped waveforms, driving voltages 48, 50, and 52 generate sinusoidal phase currents in the electric coils. By eliminating the abrupt changes in the phase currents, the present invention reduces the harmonic content of the torque waveform associated with the phase currents and reduces the related acoustic noise emitted by motor 20.

Although the present invention and its advantages are described in detail, a person skilled in the art could make various alterations, substitutions, and omissions without departing from the spirit and scope of the present invention as defined by the appended claims.

What is claimed is:

1. A method of driving an electric motor, the method comprising:

generating a periodic, driving voltage comprising a sequence of first, second, and third waveforms, the first waveform in the sequence being a generally constant, high voltage, the second waveform in the sequence being a down hook voltage, and the third waveform in the sequence being an up hook voltage; and applying the driving voltage to a coil of the motor to generate a generally sinusoidal current through the coil of the motor.

2. The method of claim 1, wherein generating a periodic, driving voltage comprises generating a driving voltage having a period of 360° and a hook amplitude, the period comprising a sequence of first, second, and third waveforms, the first waveform being a generally constant, high voltage for about 120°, the second waveform being a voltage that decreases from the high voltage to a lower voltage generally as a function of (the high voltage–the hook amplitude*sin (wt-120°)) for about 120°; and the third waveform being a voltage that increases from the lower voltage to the high voltage generally as a function of (the high voltage–the hook amplitude*sin(wt-180°)) for about 120°.

3. The method of claim 1, further comprising:
generating a phase voltage by a phase voltage shaper, the phase voltage comprising a sequence of first, second, and third waveforms, the first waveform in the sequence being a generally constant, high voltage, the second waveform in the sequence being a down hook voltage, and the third waveform in the sequence being an up hook voltage; and
driving a motor driver with the phase voltage to generate the driving voltage.

4. The method of claim 1, further comprising:
generating two periodic, hook waveforms with a sine hook wave generator, each hook waveform comprising of a down hook voltage and an up hook voltage;
switching alternatively between each of the two hook waveforms and a generally constant, high voltage to generate a phase voltage, the phase voltage comprising a sequence of first, second, and third waveforms, the first waveform in the sequence being a generally constant, high voltage, the second waveform in the sequence being a down hook voltage, and the third waveform in the sequence being a up hook voltage; and
driving a motor driver with the phase voltage to produce the driving voltage.

5. The method of claim 3, wherein generating a phase voltage comprises generating a phase voltage that is pulse-width modulated.

6. The method of claim 3, wherein generating a phase voltage comprises generating a phase voltage by a phase voltage shaper having at least one digital-to-analog converter.

7. A system of driving a three-phase motor comprising a motor driver operable to generate three periodic, driving voltages, each driving voltage comprising a sequence of first, second, and third waveforms, the first waveform in the sequence being a generally constant, high voltage, the second waveform in the sequence being a down hook voltage, and the third waveform in the sequence being an up hook voltage, the motor driver further operable to apply each driving voltage to a separate one of three coils of the motor.

8. The system of claim 7 wherein the motor driver is further operable to apply each driving voltage to a separate one of three coils of the motor such that, at any given time, each of the three coils is being driven by a separate one of the first, second, and third waveforms.

9. The system of claim 7, wherein:
each driving voltage has a period of 360° and a hook amplitude;
the first waveform is a generally constant, high voltage for about 120°;
the second waveform is a voltage that decreases from the high voltage to a lower voltage generally as a function of (the high voltage–the hook amplitude*sin(wt-120°)) for about 120°; and
the third waveform is a voltage that increases from the lower voltage to the high voltage generally as a function of (the high voltage–the hook amplitude*sin (wt-180°)) for about 120°.

10. The system of claim 7, further comprising a phase voltage shaper operable to generate three periodic, phase voltages that drive the motor driver, each phase voltage comprising a sequence of first, second, and third waveforms, the first waveform in the sequence being a generally constant, high voltage, the second waveform in the sequence being a down hook voltage, and the third waveform in the sequence being an up hook voltage.

11. The system of claim 7, further comprising:
a sine hook wave generator operable to generate two periodic, hook waveforms, each hook waveform comprising a down hook voltage and an up hook voltage; and
a multiplexer operable to switch alternatively between each of the two hook waveforms and a generally constant, high voltage to generate three phase voltages that drive the motor driver, each phase voltage comprising a sequence of first, second, and third waveforms, the first waveform in the sequence being a generally constant, high voltage, the second waveform in the sequence being a down hook voltage, and the third waveform in the sequence being an up hook voltage.

12. The system of claim 10, wherein the three phase voltages are pulse-width modulated.

13. The system of claim 10, wherein the phase voltage shaper comprises at least one digital-to-analog converter.

14. A hard disk drive system comprising:
a disk storage media operable to store information;
a spindle motor operable to rotate the disk storage media; and
a motor driver operable to apply a periodic, driving voltage to a coil of the motor to generate a generally sinusoidal current through the coil, the driving voltage comprising a sequence of first, second, and third waveforms, the first waveform in the sequence being a generally constant, high voltage, the second waveform in the sequence being a down hook voltage, and the third waveform in the sequence being an up hook voltage.

15. The hard disk drive system of claim 14, wherein:
the driving voltage has a period of 360° and a hook amplitude;
the first waveform is a generally constant, high voltage for about 120°;
the second waveform is a voltage that decreases from the high voltage to a lower voltage generally as a function of (the high voltage–the hook amplitude*sin(wt-120°)) for about 120°; and
the third waveform is a voltage that increases from the lower voltage to the high voltage generally as a function of (the high voltage–the hook amplitude*sin (wt-180°)) for about 120°.

16. The hard disk drive system of claim 14, further comprising a phase voltage shaper operable to generate a phase voltage that drives the motor driver, the phase voltage comprising of a sequence of first, second, and third waveforms, the first waveform in the sequence being a generally constant, high voltage, the second waveform in the sequence being a down hook voltage, and the third waveform in the sequence being an up hook voltage.

17. The hard disk drive system of claim 14, further comprising:
- a sine hook wave generator operable to generate two periodic, hook waveforms, each hook waveform comprising a down hook voltage and a up hook voltage; and
- a multiplexer operable to switch alternatively between each of the two hook waveforms and a generally constant, high voltage to generate a phase voltage that drives the motor driver, the phase voltage comprising of a sequence of first, second, and third waveforms, the first waveform in the sequence being a generally constant, high voltage, the second waveform in the sequence being a down hook voltage, and the third waveform in the sequence being an up hook voltage.

18. The hard disk drive system of claim 16, wherein the phase voltage is pulse-width modulated.

19. The hard disk drive system of claim 16, wherein the phase voltage shaper comprises at least one digital-to-analog converter.

* * * * *